Figure 1:
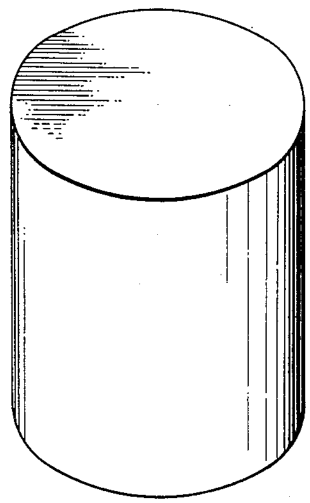

March 9, 1965 H. R. GILMORE ETAL 3,172,790

TIRE MOLD INTERMEDIATE COMPONENT

Filed July 16, 1962 2 Sheets-Sheet 1

HARLAN R. GILMORE
EUGENE C. SUNDBERG
INVENTORS

BY James E. [illegible]

ATTORNEY

TIRE MOLD INTERMEDIATE COMPONENT

Filed July 16, 1962

HARLAN R. GILMORE
EUGENE C. SUNDBERG
INVENTORS

BY James E. Toomey

ATTORNEY 3,172,790

TIRE MOLD INTERMEDIATE COMPONENT

Harlan R. Gilmore, Cuyahoga Falls, Ohio, and Eugene C. Sundberg, Erie, Pa., assignors to Kaiser Aluminum & Chemical Corporation, Oakland, Calif., a corporation Filed July 16, 1962, Ser. No. 210,095
2 Claims. (Cl. 148—32.5)

This invention generally relates to tire molds. More particularly, it relates to forged aluminum base alloy components for molds used in making tires from rubber, plastics and the like, and to the manufacture thereof.

A composite tire body consists of multiple layers of nylon, rayon or other cord material which are inseparably bonded together and over which the tread of the tire is applied. In manufacturing the tire body, the various parts, such as the layers of cord material, tread and beading, which is rubber-covered wire strip, are brought together in a tire assembly operation and combined on a precision machine with a collapsible drum. When the tire components are assembled into a "green" tire, it is sprayed with lubricants inside and out to aid in molding and then placed in a tire mold. As the mold closes, internal pressure forces a curing bladder into the tire, shaping it into a doughnut-like object. Live steam causes the mold to heat and soften the rubber, forcing it into the tread pattern of the tire mold. The heat causes a chemical change or vulcanization which fuses the component parts of the tire into an integral unit. The curing or vulcanization period lasts for a predetermined time, generally dependent upon the size of the tire. At the end of the curing cycle, the mold opens, the bladder collapses and retracts from the tire and the tire is ejected from the mold.

In the past, cast iron tire molds have been used, but these have been unsatisfactory because of poor machinability, porosity, blow holes and other defects inherent in the cast structure. Forged steel has also been used in tire mold manufacture and, because of its higher strength, it has given better performance than the cast iron. However, the forged steel tire molds still suffered from many of the same drawbacks as the cast iron molds, such as problems of machining, finishing, corrosion resistance, etc.

Aluminum cast tire molds have been employed in the tire industry and have been found to be superior over either cast iron molds or forged steel tire molds in respect to finishing, machining, corrosion resistance and thermal conductivity; however, they are still subject to the drawbacks inherent in cast metal structures.

It has now been found that tire molds can be made with a material which is as strong or stronger than the forged steel tire molds and which does not suffer from the disadvantages of the cast iron, forged steel or cast aluminum tire molds. Not only do the tire molds of the invention have longer lives than those of the prior art, but also the machined and finished surfaces of the tire mold are substantially unaffected by the drastic curing operation and consequently this attribute is reflected in the quality of the tires produced. Compared to the prior art tire molds, there is less build-up of rubber, carbon and sulfur on the surfaces of the tire mold of the invention; consequently, less cleaning of the surfaces is required.

Other features and advantages of the invention will become apparent from the ensuing description and drawings. The drawings included herewith are shown by way of example, and the invention is not to be construed as limited thereto.

The present invention provides a forged tire mold intermediate component composed of an aluminum base alloy consisting essentially of about 2.11 to 2.5% copper, about 0.9 to 1.3% iron, about 1.4 to 1.8% magnesium, about 0.9 to 1.2% nickel, about 0.04 to 1.1% titanium, less than 0.25% silicon, the balance aluminum. The forged tire mold component has an internal metallurgical structure produced by solution heat treatment after which it is subjected to an artifical aging at a temperature and a duration of time to insure partial precipitation of the alloying constituents from the supersaturated solid solution. The component can be easily machined in this state and it possesses the capability of being further strengthened after machining, by a subsequent artifical aging treatment. This subsequent aging treatment can advantageously be accomplished during the curing which the component will experience during tire production.

Figure 2:
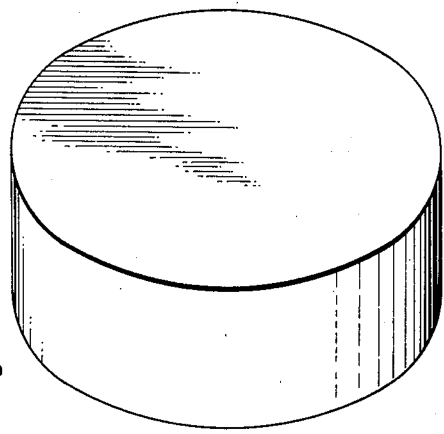
Figure 3:
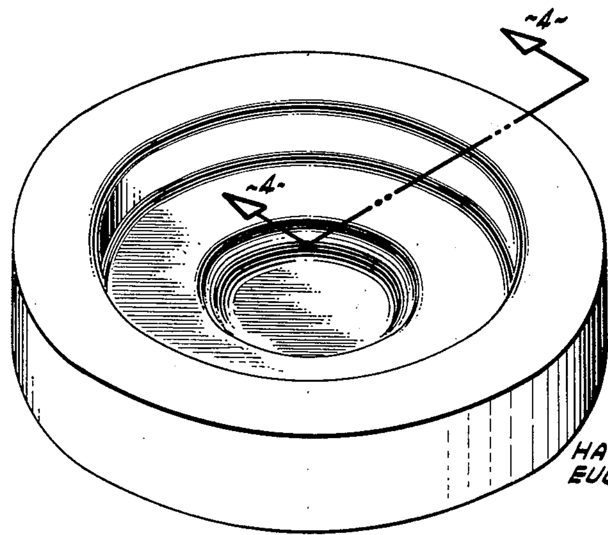
Figure 4:
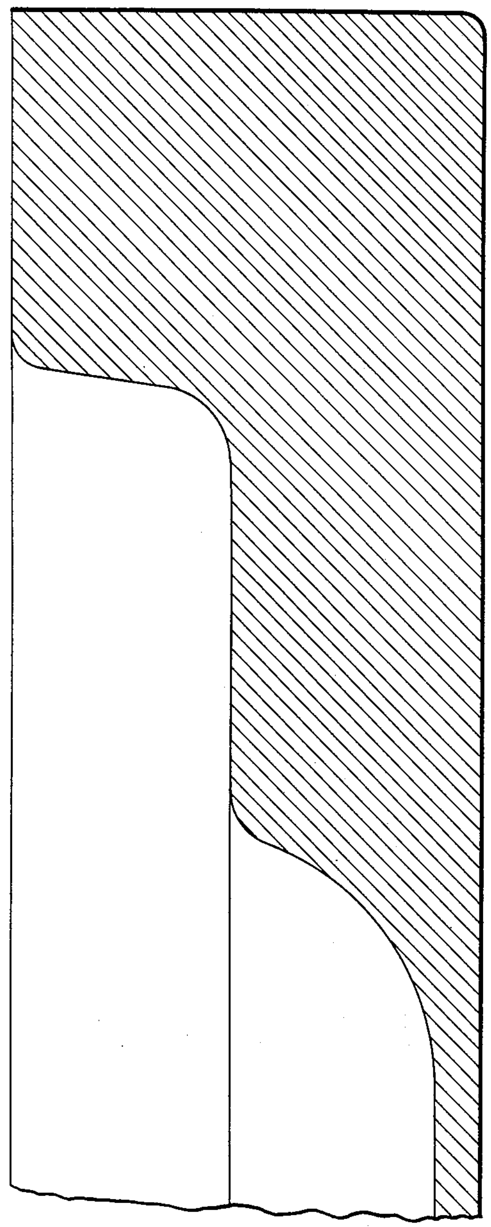
Figure 5:
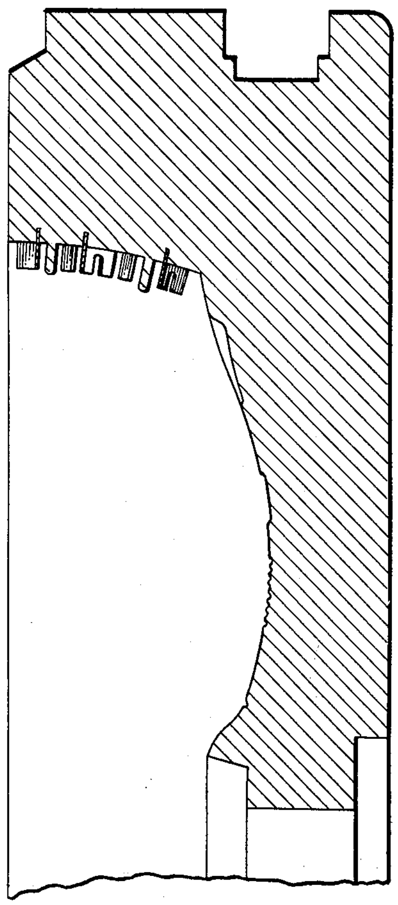

In the forging operation, the starting forging stock may be either in the cast condition or in a wrought condition. In the latter instance, the cast billet, which is preferably produced by continuous casting, is reduced to an intermediate bloom by hot rolling in a blooming mill. The hot working breaks up the cast structure of the billet, producing a wrought product having improved ductility and strength. The size and shape of the starting forging stock is commensurate with the ultimate size of the tire mold component that is desired. FIGURE 1 is a perspective view of stock of suitable shape for starting and which is forged and upset into an intermediate shape, such as that shown in FIGURE 2. Upon continuing the forging operation, the metal is progressively formed into shapes and ultimately the shape or intermediate component shown in FIGURE 3 is obtained which is a perspective view depicting the configuration of the intermediate tire mold component before machining. A cross section taken along the lines 4—4 of FIGURE 3 is shown in FIGURE 4. The desired tread design may be incorporated in the tire mold component by machining the tread design in the aluminum metal or by embedding steel inserts in the tread surface, or both. FIGURE 5 is a cross section view of a tire mold component after machining and showing the tread design.

The aluminum alloy which has a composition of about 2.11 to 2.5% copper, about 0.9 to 1.3% iron, about 1.4 to 1.8% magnesium, about 0.9 to 1.2% nickel, about 0.04 to 0.1% titanium, less than 0.25% silicon, balance aluminum, has been found ideally suited for tire mold components, when the alloy is in the forged condition. The forging is substantially porosity free and has a uniform structure throughout the forging.

The final forged shape as depicted in FIGURES 3 and 4, prior to machining, is subjected to a solution heat treatment at a temperature and for a time sufficient to cause alloying constituents to enter into solid solution followed by a rapid cooling to a supersaturated solid solution state which is then followed by an artifical aging treatment at a temperature and for a duration of time to insure partial precipitation of the constituents from the supersaturated solid solution. It has been found that the proper metallurgical structure of the tire mold component is obtained by a solution heat treatment at a temperature of between 850° and 995° F. for at least six hours after which the component is rapidly chilled and then subjected to an artifical aging treatment at a temperature in the range of about 350° to 460° F. for from one hour to three hours. This aging practice sufficiently strengthens the alloy to make it easily machinable yet soft enough to allow it to be easily steel die stamped. The aging practice should preferably be coordinated with respect to temperature and time to impart a yield strength of at least 35,000 p.s.i. to the alloy. Also, this aging practice provides thermal stress relief. After the machining of the mold component is accomplished, the mold component is placed into service. The metal of the mold component will age to a higher strength during the curing or vulcanizing step of tire production which is accomplished at about 300° to 380° F.

It is obvious that various changes or modifications may be made without departing from the scope and spirit thereof and, accordingly, the invention is not limited by what is disclosed in the foregoing description, but only by the appended claims, wherein what is claimed is:

1. A tire mold intermediate component comprising a solution heat treated, partially aged forging of an aluminum base alloy consisting essentially, on a weight basis, of from about 2.11%–2.5% copper, about 0.9%–1.3% iron, about 1.4%–1.8% magnesium, about 0.9%–1.2% nickel, about 0.04% to about 0.1% titanium, and less than 0.25% silicon and the balance aluminum and normal impurities, said component having low porosity, and being capable of being machined with smooth interior surfaces which resist adhesion to rubber, carbon and sulfur.

2. The tire mold component of claim 1 further characterized in that a tread pattern is formed in a portion thereof, said tread pattern being at least partly made up of elements of a second metal embedded in an interior surface of said mold.

References Cited in the file of this patent

UNITED STATES PATENTS 1,576,061 Pade ---------------- Mar. 9, 1926
2,522,575 Hall et al. ---------- Sept. 19, 1950

FOREIGN PATENTS 513,029 Canada -------------- May 17, 1955

OTHER REFERENCES

Iron Age, Sept. 10, 1942, pp. 41–46.